US006920179B1

(12) United States Patent
Anand et al.

(10) Patent No.: US 6,920,179 B1
(45) Date of Patent: Jul. 19, 2005

(54) METHOD AND APPARATUS FOR VIDEO TRANSMISSION OVER A HETEROGENEOUS NETWORK USING PROGRESSIVE VIDEO CODING

(75) Inventors: Raghavan Anand, Berkeley, CA (US); Hui-Ling Lou, Murray Hill, NJ (US); Christine Irene Podilchuk, Bridgewater, NJ (US)

(73) Assignee: Agere Systems Inc., Allentown, PA (US)

( * ) Notice: Subject to any disclaimer, the term of this patent is extended or adjusted under 35 U.S.C. 154(b) by 505 days.

(21) Appl. No.: 09/680,709

(22) Filed: Oct. 6, 2000

Related U.S. Application Data

(60) Provisional application No. 60/165,802, filed on Nov. 16, 1999.

(51) Int. Cl.[7] ................................................. H04N 7/18
(52) U.S. Cl. .............................. 375/240.26; 375/240.25
(58) Field of Search ........................ 375/240.01–240.29

(56) References Cited

U.S. PATENT DOCUMENTS

| | | | | |
|---|---|---|---|---|
| 6,014,694 A | * | 1/2000 | Aharoni et al. ............. | 709/219 |
| 6,327,392 B1 | * | 12/2001 | Li .............................. | 382/248 |
| 6,460,153 B1 | * | 10/2002 | Chou et al. ................. | 714/746 |
| 6,466,698 B1 | * | 10/2002 | Creusere ..................... | 382/240 |
| 6,519,284 B1 | * | 2/2003 | Pesquet-Popescu et al. ..................... | 375/240.11 |

OTHER PUBLICATIONS

K. W. Stuhlmüller et al., "Scalable Internet Video Streaming With Unequal Error Protection," Packet Video Workshop, New York, pp. 1–8, Apr. 1999.

B. Girod et al., "Packet Loss Resilient Internet Video Streaming," Visual Communications and Image Processing '99, SPIE, San Jose, CA, 12 pages, Jan. 1999.

C. Leicher, "Hierarchical Encoding of MPEG Sequences Using Priority Encoding Transmission (PET)," Berkeley Technical Report TR–94–058, 59 pages, Nov. 1994.

J. Wen et al., "A Class of Reversible Variable Length Codes For Robust Image and Video Coding," Proceedings of the IEEE International Conference on Image Processing, Santa Barbara, CA, vol. 2, pp. 65–68, Oct. 1997.

J. Villasenor et al., "Robust Video Coding Algorithms and Systems," Proceedings of the IEEE, vol. 87, No. 10, pp. 1724–1733, Oct. 1999.

(Continued)

*Primary Examiner*—Andy Rao

(57) ABSTRACT

A video signal is encoded in a progressive video coder so as to generate a progressive coded video bit stream for transmission over a heterogeneous network. The progressive coded video bit stream is configured so as to be decodable at any one of a series of increasing bit rates up to a maximum bit rate, depending on which of a number of corresponding portions of the progressive coded video bit stream are received by a decoder. Each of the portions is associated with a different bit rate, and one or more of the portions may each also be associated with different values of other parameters such as frame rate, spatial resolution, and peak signal-to-noise ratio. Each of the series of increasing bit rates produces progressively better reconstructed video quality at an output of the decoder. The progressive coded bit stream is transmitted over a first part of the heterogeneous network at a first one of the bit rates. One or more selected portions of the progressive coded video bit stream are then transmitted from the first part of the heterogeneous network to a second part of the heterogeneous network. The selected portions are associated with a second one of the bit rates lower than the first bit rate, and may be selected based on an error detected in the transmission over the first part of the heterogeneous network, and/or a characteristic of the second part of the heterogeneous network. The invention provides efficient bit rate scalability and adaptability and is particularly well-suited for use in conjunction with transmission over heterogeneous wired-to-wireless networks.

20 Claims, 4 Drawing Sheets

OTHER PUBLICATIONS

N. Färber et al., "Extensions of ITU–T Recommendation H.324 For Error–Resilient Video Transmission," IEEE Communications Magazine, pp. 120–128, Jun. 1998.

G. de los Reyes et al., "Video Transmission For Resilience in Wireless Channels," IEEE International Conference on Image Processing, pp. 338–342, Oct. 1998.

B. Girod et al., "Feedback–Based Error Control for Mobile Video Transmission," Proceedings of the IEEE, vol. 87, No. 10, pp. 1707–1723, Oct. 1999.

A.E. Mohr et al., "Graceful Degradation Over Packet Erasure Channels Through Forward Error Correction," Proceedings of the 1999 Data Compression Conference (DCC), Snowbird, Utah, pp. 1–10, 1999.

R. Puri et al., "Multiple Description Source Coding Using Forward Error Correction Codes," IEEE, pp. 342–346, 1999.

P.G. Sherwood et al., "Error Protection For Progressive Image Transmission Over Memoryless and Fading Channels," IEEE Transactions on Communications, vol. 46, No. 12, pp. 1555–1559, Dec. 1998.

* cited by examiner

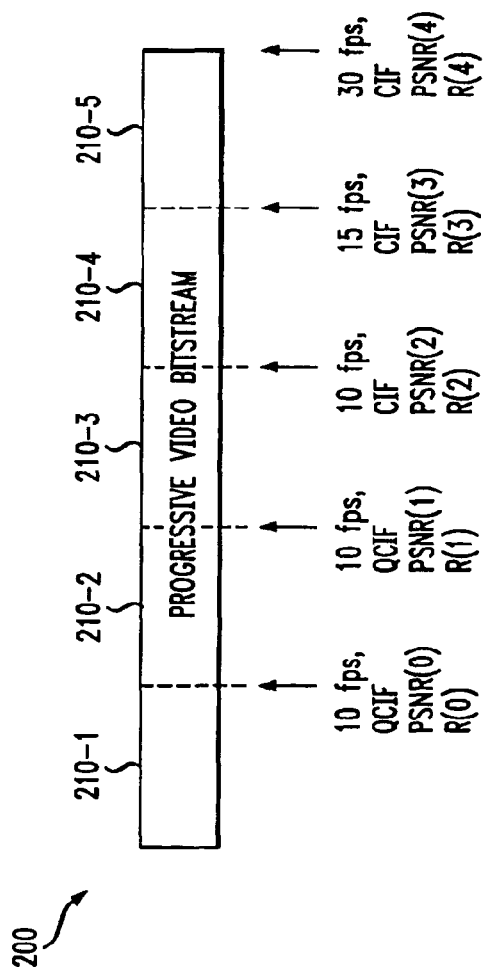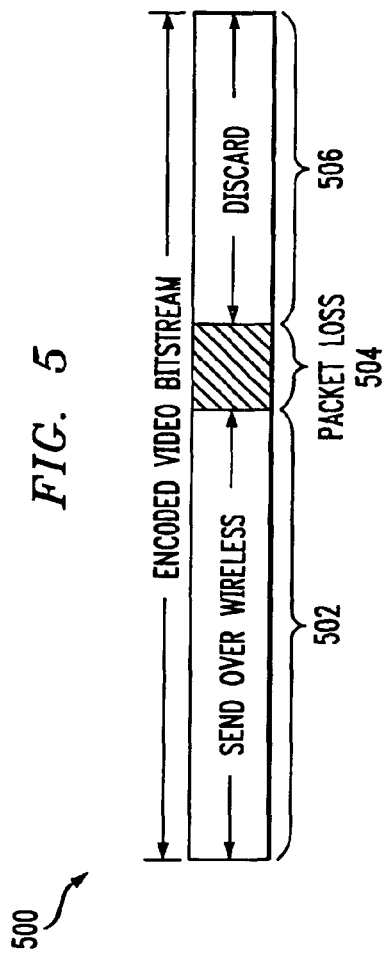

METHOD AND APPARATUS FOR VIDEO TRANSMISSION OVER A HETEROGENEOUS NETWORK USING PROGRESSIVE VIDEO CODING

PRIORITY CLAIM

The present application claims the benefit of U.S. Provisional Application No. 60/165,802, filed Nov. 16, 1999 and entitled "A Framework for Video Transmission Over a Heterogeneous Wired-to-Wireless Network."

RELATED APPLICATION

The present application is related to U.S. patent application Ser. No. 09/680,708 entitled "Method and Apparatus for Providing Channel Error Protection for a Source Coded Bit Stream," filed concurrently herewith in the name of inventors R. Anand, H.-L. Lou and C. Podilchuk, and incorporated by reference herein.

FIELD OF THE INVENTION

The present invention relates generally to information coding and transmission, and more particularly to transmission of progressive coded video over a heterogeneous network.

BACKGROUND OF THE INVENTION

In conventional communication systems, a coded video bit stream may be transmitted over a heterogeneous wired-to-wireless network. For example, the coded video bit stream may be transmitted from a wired Internet connection to a wireless mobile receiver. Due to differences in loss conditions and bandwidth constraints between the wired and wireless portions of the network, it is common in such coded video bit stream transmissions to partially or fully decode the coded video bit stream, reencode the video at an appropriate rate, and then add error resiliency properties prior to transmission to the wireless receiver. An example of a technique of this type is described in G. de los Reyes et al., "Video Transmission For Resilience in Wireless Channels," IEEE International Conference on Image Processing," Chicago, Ill., pp. 338–342, October 1998.

Other known video bit stream adaptation techniques have focused primarily on scalability of the video bit stream to different bandwidth conditions. For example, layered video coders have been developed which generate video bit streams consisting of several layers, usually a base layer followed by one or more enhancement layers, as described in S. McCanne, "Scalable Compression and Transmission of Internet Multicast Video," Ph.D. Thesis, University of California Berkeley, December 1996. The layered video coder allows users with greater bandwidth capability to subscribe to more layers, and thereby receive better video quality, while users with less bandwidth capability can subscribe to the base layer only. This provides adaptive video quality for different users while minimizing the bandwidth inefficiency associated with transmission of the video at several different bit rates.

Current video coding standards such as MPEG-2 and H.263 also have layered coding profiles, with options of temporal, spatial, signal-to-noise ratio (SNR) and hybrid scalability. For example, the MPEG-2 standard describes a spatially-scalable profile which consists of two layers, a digital standard television resolution layer and an enhancement layer for high definition television. See, e.g., B. Haskell et al., "Digital Video: An Introduction to MPEG-2," Chapman and Hall, 1997. However, the scalability options for these current standards come at the expense of compression performance. These and other layered coders offer scalability on a coarse level in that each layer must be completely received in order to be utilized in enhancing the video quality.

Transcoders have also been used to provide bit rate adaptability in applications such as the above-noted wired-to-wireless heterogeneous network. Conventional transcoding techniques generally focus on either bit rate conversion or conversion between standards, e.g., H.263 to H.261 conversion. Since the current video coding standards generally have the same basic components, transcoders are designed to reuse as many of the components as possible. For example, it is highly desirable to reuse the motion vector estimates, since their generation is a computationally very expensive process. Other techniques have addressed the issue of reducing the overall bit rate, e.g., converting from a high bit rate studio format to a low bit rate distribution format, while utilizing as much of the original bit stream information as possible, e.g., the original motion vector estimates and coding mode choices.

A significant problem with conventional transcoders is that decoding and recoding the video bit stream can adversely impact the resulting reconstructed video quality. In addition, the decoding and recoding operations can introduce substantial additional delay as well as computational complexity in a video transmission system.

Known video transmission techniques for lossy channel conditions have focused on either adding error resilient features to well-defined coding standards such as H.263++ and MPEG-4, or on channel coding for either packet losses over Internet protocol (IP) connections or wireless channel conditions. Examples of the former types of techniques are described in J. Wen et al., "A Class of Reversible Variable Length Codes For Robust Image and Video Coding," Proceedings of the IEEE International Conference on Image Processing, Santa Barbara, Calif., Vol. 2, pp. 65–68, October 1997; J. Villasenor et al., "Robust Video Coding Algorithms and Systems," Proceedings of the IEEE, Special Issue on Video Transmission For Mobil Multimedia Applications, Vol. 87. No. 10, pp. 1724–1733. October 1999; and N. Färber et al., "Extensions of ITU-T Recommendation H.324 For Error-Resilient Video Transmission," IEEE Communications Magazine, pp. 120–128, June 1998, while examples of the latter types of techniques are described in C. Leicher, "Hierarchical Encoding of MPEG Sequences Using Priority Encoding Transmission (PET)," Berkeley Technical Report TR-94-058, November 1994; B. Girod et al., "Packet Loss Resilient Internet Video Streaming," Visual Communications and Image Processing '99, SPIE, San Jose, Calif., January 1999; A. E. Mohr et al., "Graceful Degradation Over Packet Erasure Channels Through Forward Error Correction," Proceedings of the 1999 Data Compression Conference (DCC), Snowbird, Utah, pp.1–10, 1999; K. W. Stuhlmüller et al., "Scalable Internet Video Streaming With Unequal Error Protection," Packet Video Workshop, New York, pp. 1–8. April 1999; R. Puri et al., "Multiple Description Source Coding Using Forward Error Correction (FEC) Codes" $33^{rd}$ ASILOMAR Conference on Signals, Systems, and Computers, Pacific Grove, Calif., IEEE, pp. 342–346, 1999; B. Girod et al., "Feedback-Based Error Control for Mobile Video Transmission," Proceedings of the IEEE, Special Issue on Video Transmission For Mobile Multimedia Applications, Vol. 87, No. 10, pp. 1707–1723, October 1999; and P. G. Sherwood et al., "Error Protection For Progressive Image Transmission Over Memoryless and Fading Channels," IEEE Transactions on Communications, Vol. 46, No. 12, pp. 1555–1559, December 1998.

Unfortunately, the above-noted conventional techniques have been unable to provide an efficient general framework for video transmission over a heterogeneous network, which allows bit rate scalability, adaptability across different network conditions, and graceful degradation in the presence of channel errors. A need therefore exists in the art for such a framework.

SUMMARY OF THE INVENTION

The present invention provides methods and apparatus for video transmission over a heterogeneous network which meet the above-described need by generating a progressive coded video bit stream configured so as to be decodable at any one of a series of increasing bit rates up to a maximum bit rate, depending on which of a number of corresponding portions of the progressive coded video bit stream are received by a decoder. Each of the portions is associated with a different bit rate, and one or more of the portions may each also be associated with different values of other coding-related parameters such as frame rate, spatial resolution, and peak signal-to-noise ratio. Each of the series of increasing bit rates produces progressively better reconstructed video signal quality at an output of the decoder. The progressive coded bit stream is transmitted over a first part of a heterogeneous network at a first one of the bit rates. One or more selected portions of the progressive coded video bit stream are then transmitted from the first part of the heterogeneous network to a second part of the heterogeneous network. The selected portions are associated with a second one of the bit rates lower than the first bit rate, and may be selected based on an error detected in the transmission over the first part of the heterogeneous network, a characteristic of the second part of the heterogeneous network, or combinations of these and other factors.

Advantageously, the present invention provides efficient bit rate scalability and adaptability and is particularly well-suited for use in conjunction with transmission over heterogeneous wired-to-wireless networks. For example, the present invention allows bit rate scalability and adaptation across a wired-to-wireless network without incurring the substantial additional delay and computational complexity usually associated with a conventional transcoder.

BRIEF DESCRIPTION OF THE DRAWINGS

FIGS. 2 and 3 show examples of progressive video bit streams generated in accordance with the techniques of the present invention.

FIG. 5 illustrates the processing of a progressive video bit stream generated in accordance with the present invention in the wired-to-wireless system of FIG. 4.

DETAILED DESCRIPTION OF THE INVENTION

The following description will illustrate the invention using exemplary communication systems. It should be understood, however, that the invention is more generally applicable to any communication system or video transmission application which can benefit from video transmission with efficient bit rate scalability and adaptability. Although particularly well-suited for use in conjunction with fully-embedded progressive coded video bit streams, the techniques of the invention are also applicable to other types of coded video bit streams, such as partitioned video bit streams. The term "progressive coded video bit stream" as used herein should be understood to include such other types of coded video bit streams.

Figure 1:
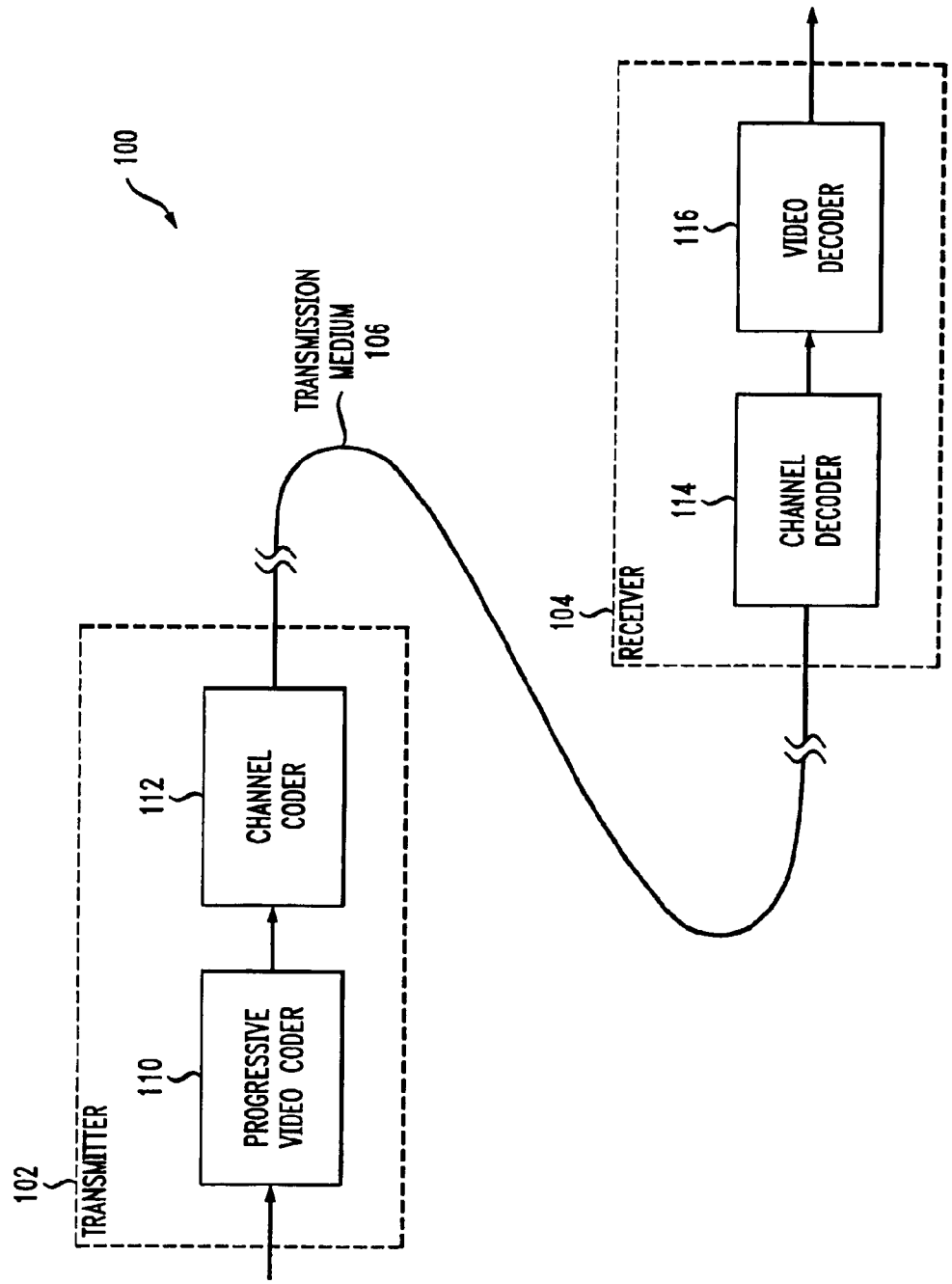
FIG. 1 shows a simplified block diagram of one type of communication system in which the present invention may be implemented.

FIG. 1 shows a simplified block diagram of an example communication system 100 in which the present invention may be implemented. The system 100 includes a transmitter 102 and a receiver 104 configured to communicate over a transmission medium 106. The transmission medium 106 may represent a portion of a wired or wireless network, combinations of different portions of such networks, or any other type of communication channel(s). The transmitter 102 includes a progressive video coder 110 and a channel coder 112. The receiver 104 includes a channel decoder 114 and a video decoder 116. The video decoder 116 is a type of video decoder capable of decoding a progressive video bit stream of the type generated by coder 110.

In operation, a source video signal is applied to the progressive video coder 110. The source video signal may comprise, e.g., a sequence of frames. The progressive video coder 110 generates a progressive coded video bit stream in a manner to be described in greater detail below in conjunction with FIGS. 2 and 3. The progressive coded video bit stream is then applied to the channel coder 112, which applies unequal error protection channel coding to the progressive source coded bit stream using the progressive channel coding techniques described in the above-cited U.S. patent application Ser. No. 09/680,708. It should be noted, however, that other channel coding techniques could also be used.

The output of the channel coder 112 may be further processed using conventional communication system operations such as modulation, multiplexing, upconversion, amplification, filtering, etc. These operations are omitted from the figure for simplicity and clarity of illustration. The resulting signal is passed over the transmission medium 106 and subject to complementary communication system operations in or prior to the receiver 104. The recovered channel coded bit stream is applied to channel decoder 114, and the resulting progressive coded video bit stream is decoded in video decoder 116 to obtain a reconstructed version of the original information bit stream. The channel coder 112 and channel decoder 114 are preferably a convolutional coder and decoder, respectively, although other types of channel coding could also be used.

The present invention provides progressive coded video transmission techniques suitable for use in the system 100 of FIG. 1 or in other types of communication systems. In an illustrative embodiment of the invention, a progressive video coder generates a fully-embedded bit stream that can be decoded at any desired intermediate bit rate up to a maximum specified target bit rate, producing progressively better reconstructed video quality with increasing bit rate. Advantageously, the progressive video transmission techniques of the present invention are highly scalable in bit rate, and thereby allow adaptability to different bandwidth conditions over a heterogeneous network as well as a framework for introducing graceful degradation in video quality in the presence of bit errors and bandwidth constraints.

FIG. 2 shows an example of a progressive coded video bit stream 200 generated in the progressive video coder 110. In this example, the bit stream 200 may be viewed as separated into five portions 210-1, 210-2, 210-3, 210-4 and 210-5 as shown. The fully recovered bit stream results in the maximum bit rate denoted R(4) and a maximum peak signal-to-noise ratio (PSNR) denoted PSNR(4). The progressively-coded video data is prioritized from left to right within the bit stream 200 so that with unequal error protection, as packet losses increase, the recovered video signal at the receiver scales back first in temporal resolution (frame rate), followed by spatial resolution (pixels per frame), followed by quantizer step size (PSNR and bit rate).

More particularly, the maximum target bit rate R(4), which is achieved when all five portions of the bit stream 200 are received, corresponds to a 30 frame per second (fps) video signal having a common intermediate format (CIF) resolution of 360×240 pixels. The bit stream 200 scales down from right to left in terms of frame rate, from 30 fps if all five portions are received, to 15 fps if the first four are received, and subsequently to 10 fps if only the first three or fewer portions are received. Similarly, the bit stream scales down from right to left in resolution from the CIF resolution if at least the first three portions are received, to a quarter-CIF (QCIF) resolution of 180×120 pixels if only the first two or fewer portions are received. The bit stream 200 also scales downward from right to left in peak signal-to-noise ratio (PSNR), from a maximum value PSNR(4) through intermediate values PSNR(3), PSNR(2), PSNR(1) and PSNR(O) depending on the portions received, and in bit rate, from the above-noted maximum target bit rate R(4) through intermediate values R(3), R(2), R(1) and R(0), again depending on the portions received.

As mentioned previously, a fully-embedded progressive coded video bit steam such as that shown in FIG. 2 can be provided with unequal channel error protection in the manner described in the above-cited U.S. patent application Ser. No. 09/680,708. Such an arrangement allows for efficient adaptation of the bit stream across heterogeneous networks, with low complexity and optimum bandwidth utilization. More particularly, a progressive coded video bit stream of the type described above can be utilized in the illustrative embodiment of the invention to provide direct bit rate adaptability at the bit stream level, such that an encoded video sequence can adapt to any bit rate available across a given heterogeneous wired-to-wireless network.

In addition, the bit stream can be used to provide direct adaptability to packet losses or other errors incurred during transmission over the wired portion of such a network. The embedded coding framework permits the determination of which part of the data to discard due to packet losses. The above-noted unequal error protection allows the high priority data to be provided with a higher level of protection than the low priority data, so that packet losses result in a drop in video quality equivalent to scaling back the embedded bit stream to a lower rate. Furthermore, the structure of the embedded sequence allows the bit stream to be scaled back in terms of frame rate, spatial resolution and PSNR. In other words, packet losses can result in lower frame rate, lower spatial resolution or lower PSNR, or combinations thereof, depending on the severity of the channel conditions. The scaling back is typically first done temporally, then spatially and finally in PSNR, but any order could be used, including multiple passes in any order. This is in contrast to a non-progressive bit stream such as a conventional MPEG bit stream in which packet losses can result in visible block-like distortions that can propagate over many frames.

The progressive coded video bit stream transmission techniques in accordance with the invention also provide efficient bandwidth utilization for wireless portions of a heterogeneous wired-to-wireless network. Because the video scales back in rate for channel losses incurred during transmission, one can determine exactly how much of the original video bit stream can be recovered and send only useful data over the bandwidth-constrained wireless link. This generally cannot be done for conventional MPEG and H.263 coders because motion estimation and inter- and intra-frame dependencies make it difficult to determine what data remains useful after packet losses.

Another advantage of the progressive coded video bit stream transmission techniques of the present invention is that by sending only the useful video data over the wireless portion of a given wired-to-wireless network connection, any remaining bandwidth can be used for additional physical layer channel coding. A feedback channel could also be implemented so as to provide information for adapting the source and channel coding bit rate allocation, such that the bit stream can be appropriately scaled in accordance with channel conditions.

The present invention can be implemented using a conventional progressive video coder. For example, a so-called Set Partitioning in Hierarchical Trees (SPIHT) coder may be used to implement the progressive video coding described above. Additional details regarding conventional SPIHT coders are described in, e.g., A. Said et al., "A New Fast and Efficient Image Codec Based on Set Partitioning in Hierarchical Trees," IEEE Transactions on Circuits and Systems for Video Technology, Vol. 6, June 1996; B.-J. Kim et al., "Very Low Bit-Rate Embedded Video Coding with 3D Set Partitioning in Hierarchical Trees (3D SPIHT)," IEEE Transactions on Circuits and Systems for Video Technology, Special Issue on Image and Video Processing for Emerging Interactive Multimedia Services, September 1998; and B.-J. Kim et al., "Low-Delay Embedded 3*D Wavelet Color* Video Coding with SPIHT," Proc. SPIE, Visual Communications and Image Processing '98, pp. 955–964, January 1998; all of which are incorporated by reference herein.

In the illustrative embodiment of the present invention, a fully-embedded progressive bit stream is generated for a given group of frames of a video signal to be encoded. The above-noted SPIHT coder can be utilized to produce a bit stream that is PSNR scalable, since the location of a next wavelet coefficient to be coded may be chosen to maximize a reduction in mean square error. The same bit stream can be reordered to produce a temporally or spatially scalable bit stream as well.

As previously noted in conjunction with FIG. 2, a progressive video coder suitable for use in conjunction with the invention produces a bit stream having a well-defined priority. Experiments performed on such a bit stream indicate that at least about 20% of the bit stream generally must be received error free in order to produce a useful and observable output video signal. Thus, the initial 20% of the bits of the bit stream require heavy error protection, depending on the channel condition and the delay allowed in the system. Furthermore, depending on the minimum decoded video quality to be guaranteed to each user, heavy error protection of more than 20% of the video bit stream may be required. For example, an automatic repeat request (ARQ) technique may be used for this portion of the bit stream, with decreasing levels of error protection for less important portions of the bit stream. The above-noted unequal error protection can be used to protect the rest of the bit stream since if the more important bits are not received error free, bits in the rest of the bit stream generally cannot improve the decoded signal quality. Due to the embedded nature of the bit stream, an erroneous decoded bit can result in loss of synchronization such that the remaining decoded bits only add to the error or noise in the decoded video stream.

Although the channel error protection for the progressive bit stream is preferably provided using the techniques described in the above-cited U.S. patent application Ser. No. 09/680,708, any of a wide variety of well-known conventional channel coding techniques may be used in conjunction with the invention, such as convolutional or Turbo codes, cyclic redundancy check (CRC) codes, or combinations of these and other codes. For example, rate compatible puncturing of convolutional or Turbo codes may be used to provide unequal error protection for the progressive bit stream. Such channel coding techniques are known in the art and therefore not described in detail herein.

The above-noted experiments also indicated that if an error occurs in the most important portion of the bits in the progressive bit stream, i.e., approximately the first 60% of the bit stream, source decoding of this bit stream should be terminated and the rest of the bits in the bit stream should be discarded. In such situations, error detection is sufficient and error correction is not required. However, strong error detection capability is also required by these most important (~60%) bits in the bit stream. Bit errors in the least significant portion of the progressive bit stream generally do not have a tremendous impact on output visual quality whether or not the bit errors are detected and corrected. Therefore, error detection alone may be used, or alternatively there may be no error protection provided for these least significant bits. The amount of channel error protection assigned to each bit can be chosen to maximize the expected PSNR given factors such as the total allowed redundancy, the channel SNR of the system, and the time permitted to transmit the remainder of the bit stream.

As mentioned previously, channel error protection techniques suitable for use in conjunction with the present invention are disclosed in U.S. patent application Ser. No. 09/680,708.

A more detailed example of a type of communication system in which the present invention may be implemented will now be described with reference to FIGS. 3, 4 and 5.

Figure 3:
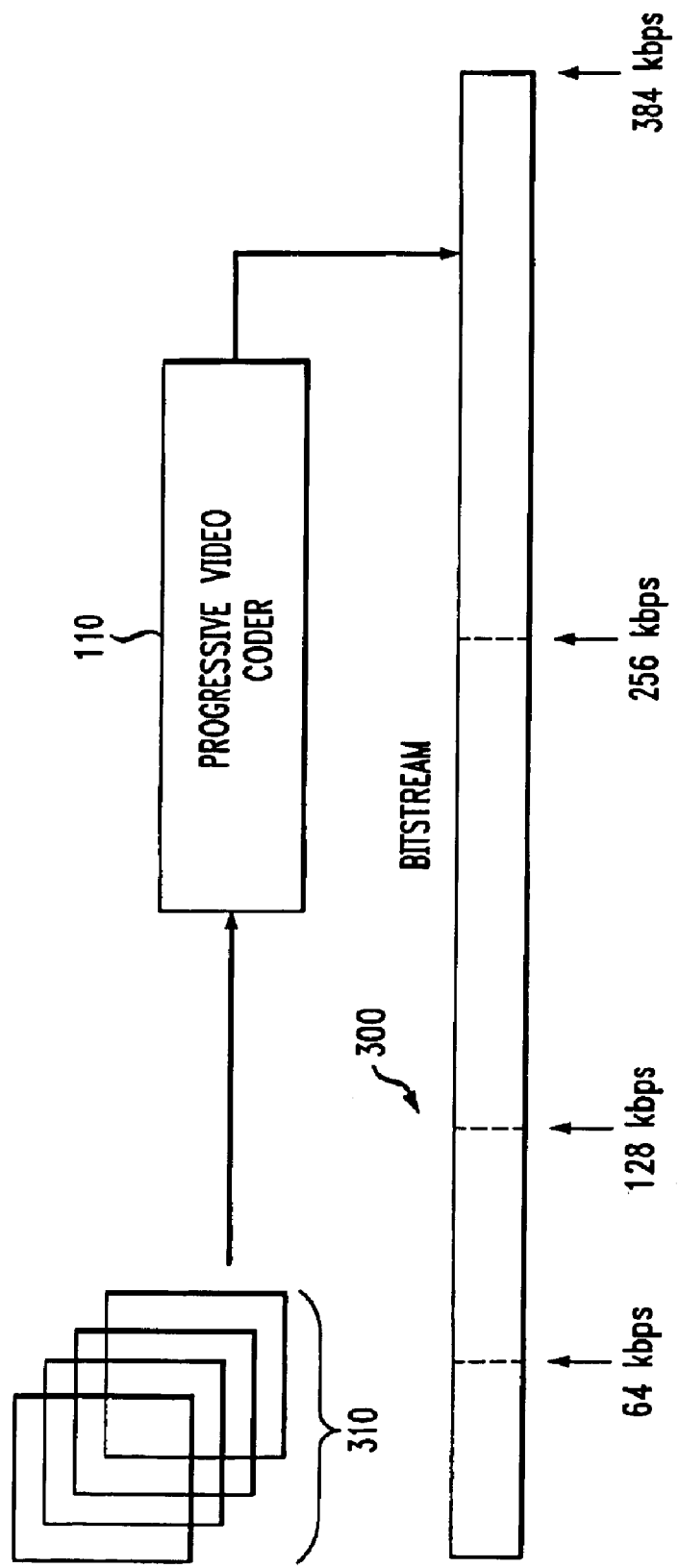

FIG. 3 shows a progressive coded video bit stream 300 generated by progressive video coder 110 from a given group of frames 310. The group of frames may represent, e.g., a group of pictures (GOP) as the term is used in conventional video coding standards, or any other type of video signal or image sequence. The bit stream 300 may be viewed as including a number of different portions, with a maximum target bit rate of 384 kbps achieved when all portions are received, and intermediate bit rates of 64 kbps, 128 kbps and 256 kbps being achieved if only first, second or third portions, respectively, are received.

Figure 4:
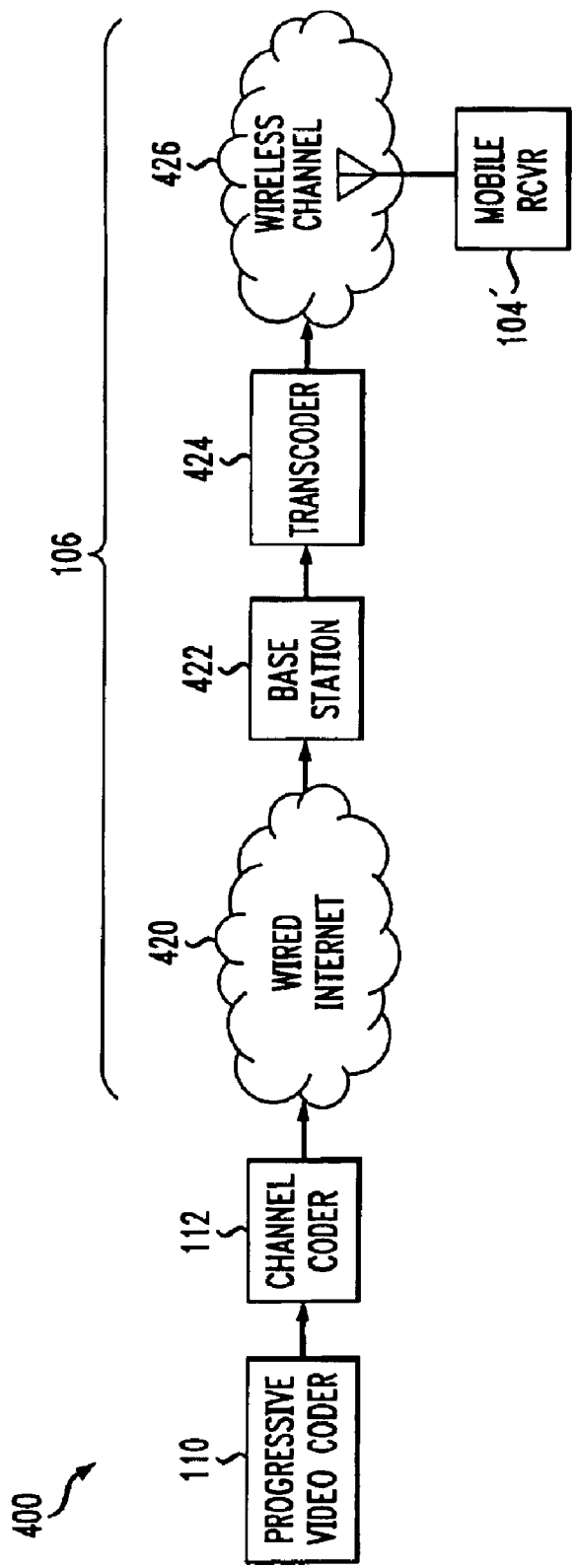
FIG. 4 shows a wired-to-wireless implementation of the system of FIG. 1 in which the present invention may be implemented.

FIG. 4 shows a heterogenous wired-to-wireless network communication system 400 in which the progressive coded video bit stream 300 of FIG. 3 may be utilized. The system 400 includes progressive video coder 110 and channel coder 112. The transmission medium 106 in this system includes a heterogeneous wired-to-wireless network connection through wired Internet 420 to a base station 422 of a wireless network. It should be understood that this is just one example of a heterogeneous network that may be utilized in conjunction with the invention. The term "heterogeneous network" as used herein is intended to include any type of network or other transmission medium having parts with different bandwidths, channel conditions or other capacity constraints.

A transcoder 424 processes the base station output for delivery via a wireless channel 426 to a mobile receiver 104'. The mobile receiver 104' is assumed to include the channel decoder 114 and video decoder 116 of FIG. 1 as well as additional signal processing elements. Although the transcoder 424 is shown as being after the base station 422 in this embodiment, in other embodiments it could be located before the base station 422, could be within the base station 422, or could be located elsewhere within the heterogeneous network. As will be described in greater detail below, the network element 424 is more generally referred to herein as a network element, and such an element may be implemented in a given embodiment without the use of transcoding operations.

In operation, the progressive video bit stream 300 of FIG. 3 is generated by the progressive video coder 110. The channel coder 112 provides progressive channel error protection for the progressive source stream in the manner described in the above-cited U.S. patent application Ser. No. 09/680,708. The resulting channel coded output is delivered via transmission medium 106 to the mobile receiver 104' where it is processed to recover the original video stream.

The transcoder 424 is operative to process the progressive video bit stream as received from the wired Internet 420 for transmission over the wireless channel 426 to the mobile receiver 104'. This processing is illustrated in FIG. 5. The bit stream 500 represents an encoded video bit stream as received from the wired Internet 420, and as shown includes a first portion 502, a second portion 504, and a third portion 506. The second portion 504 represents a portion of the stream that was not received at the transcoder 424 due to packet loss in the wired Internet. The first and third portions 502 and 506, respectively, are received correctly. However, since the bit stream is a progressive bit stream, only the first portion 502 is sent over the wireless channel 426 to the mobile receiver 104'. The remaining portion 506, although correctly received, is nonetheless discarded rather than transmitted over the wireless channel 426. This is because the portion 506 is generally of little or no use in the decoding process, given the loss of portion 504, and therefore valuable bandwidth in the wireless channel 426 is conserved by discarding the portion 506.

The progressive source coded bit stream provides the bit rate scalability that allows the bit stream to be adapted in an efficient manner for delivery over wireless channel 426 as described above. For example, the portion 502 may be such that it permits transmission of a 128 kbps version of the video bit stream over the wireless channel 426, without requiring actual decoding and recoding of the received bit stream in the transcoder 424. The complexity of transcoder 424 is thereby considerably reduced. Although the network element 424 is labeled as a transcoder in this example, it should be understood that the present invention allows such an element to be implemented without the use of decoding or recoding operations. More particularly, network element 424 may be a general signal processing element implemented in a gateway or other network interface of the heterogeneous network, and need not provide any transcoding operations. Advantageously, the present invention provides bit rate scalability and adaptability without the need for transcoding operations. Of course, network element 424 may be implemented as an element which provides both transcoding for conventional non-progressive bit streams and bit rate scalability and adaptability for a progressive coded bit stream without transcoding using the techniques of the invention.

The elements of the systems of FIGS. 1 and 4 are shown in simplified form for clarity of illustration. It should be understood that one or more of these elements may be implemented using processor-based devices such as microprocessors, digital signal processors (DSPs), application-specific integrated circuits (ASICs) as well as portions or combinations of these and other devices. The invention may be implemented in whole or in part in the form of one or more software programs stored and executed by such devices. Moreover, as previously noted, the FIGS. 1 and 4 systems may include additional elements not explicitly shown in the figures.

The above-described embodiments of the invention are intended to be illustrative only. More particularly, the specific system elements and configurations described in conjunction with the illustrative embodiments are shown by way of example only, and numerous alternative system configurations are possible. In addition, the particular progressive coded video bit stream arrangements shown in FIGS. 2 and 3 are by way of example only, and alternative embodiments may use other scalability configurations. Furthermore, the invention can be implemented at least in part in one or more software programs stored in a memory of the network element 424 and executed by a processor thereof. These and numerous other embodiments within the scope of the following claims will be apparent to those skilled in the art.

What is claimed is:

1. A method of processing a video signal for transmission over a heterogeneous network, the method comprising the steps of:
   coding the video signal in a progressive video coder so as to generate a progressive coded video bit stream comprising a plurality of frames of the video signal, wherein the progressive coded video bit stream is configured to be decodable at any one of a series of increasing bit rates up to a maximum bit rate, depending on which of a number of corresponding portions of the progressive coded video bit stream are received by a decoder, the portions being arranged within the progressive coded video bit stream in a predetermined sequence of increasing bit rates from an initial portion associated with a lowest one of the bit rates to a final portion associated with a highest one of the bit rates, and wherein each of the series of increasing bit rates produce progressively better reconstructed video quality at an output of the decoder;
   transmitting the progressive coded video bit stream over a first part of the heterogeneous network at a first one of the bit rates; and
   selectively transmitting one or more of the portions of the progressive coded video bit stream from the first part of the heterogeneous network to a second part of the heterogeneous network, the one or more portions being associated with a second one of the bit rates lower than the first bit rate, the one or more portions and the associated second bit rate being selected based at least in part on one or more of: (i) an error detected in the transmission over the first part of the heterogeneous network; and (ii) a characteristic of the second part of the heterogeneous network.

2. The method of claim 1 wherein the progressive coded video bit stream corresponds to a given group of frames of the video signal.

3. The method of claim 1 wherein each of the corresponding portions is associated with a different bit rate.

4. The method of claim 1 wherein each of at least a subset of the corresponding portions are associated with different frame rates.

5. The method of claim 1 wherein each of at least a subset of the corresponding portions are associated with different spatial resolutions.

6. The method of claim 1 wherein each of at least a subset of the corresponding portions are associated with different signal-to-noise ratios.

7. The method of claim 1 wherein the particular portions of the progressive coded video bit stream which are received over the first part of the heterogeneous network determine a corresponding amount of the bit stream that will be transmitted over the second part of the heterogeneous network to the decoder for decoding at a particular one of the series of increasing bit rates.

8. The method of claim 1 wherein the first part of the heterogeneous network comprises a wired network connection and the second part of the heterogeneous network connection comprises a wireless network connection.

9. The method of claim 8 wherein the wired network connection comprises a wired Internet connection, and the wireless network connection comprises a wireless channel to a mobile receiver associated with the decoder.

10. An apparatus for use in processing a video signal, the video signal being coded so as to generate a progressive coded video bit stream comprising a plurality of frames of the video signal, wherein the progressive coded video bit stream is configured to be decodable at any one of a series of increasing bit rates up to a maximum bit rate, depending on which of a number of corresponding portions of the progressive coded video bit stream are received by a decoder, and wherein each of the series of increasing bit rates produce progressively better reconstructed video quality at an output of the decoder, the progressive coded video bit stream being transmitted over a first part of the heterogeneous network at a first one of the bit rates, the apparatus comprising:
   a network element coupled between the first part of the heterogeneous network and a second part of the heterogeneous network, the network element being operative to selectively transmit one or more of the portions of the progressive coded video bit stream from the first part of the heterogeneous network to the second part of the heterogeneous network, the one or more portions being associated with a second one of the bit rates lower than the first bit rate, the one or more portions and the associated second bit rate being selected based at least in part on one or more of: (i) an error detected in the transmission over the first part of the heterogeneous network; and (ii) a characteristic of the second part of the heterogeneous network;
   wherein the portions are arranged within the progressive coded video bit stream in a predetermined sequence of increasing bit rates from an initial portion associated with a lowest one of the bit rates to a final portion associated with a highest one of the bit rates.

11. The apparatus of claim 10 wherein the progressive coded video bit stream corresponds to a given group of frames of the video signal.

12. The apparatus of claim 10 wherein each of the corresponding portions is associated with a different bit rate.

13. The apparatus of claim 10 wherein each of at least a subset of the corresponding portions are associated with different frame rates.

14. The apparatus of claim 10 wherein each of at least a subset of the corresponding portions are associated with different spatial resolutions.

15. The apparatus of claim 10 wherein each of at least a subset of the corresponding portions are associated with different signal-to-noise ratios.

16. The apparatus of claim 10 wherein the particular portions of the progressive coded video bit stream which are received over the first part of the heterogeneous network determine a corresponding amount of the bit stream that will be transmitted over the second part of the heterogeneous network to the decoder for decoding at a particular one of the series of increasing bit rates.

17. The apparatus of claim 10 wherein the first part of the heterogeneous network comprises a wired network connection and the second part of the heterogeneous network comprises a wireless network connection.

18. The apparatus of claim 17 wherein the wired network connection comprises a wired Internet connection, and the wireless network connection comprises a wireless channel to a mobile receiver associated with the decoder.

19. An article of manufacture comprising a storage medium for storing one or more software programs for use in processing a video signal for transmission over a heterogeneous network, the video signal being coded so as to generate a progressive coded video bit stream comprising a plurality of frames of the video signal, wherein the progressive coded video bit stream is configured to be decodable at any one of a series of increasing bit rates up to a maximum bit rate, depending on which of a number of corresponding portions of the progressive coded video bit stream are received by a decoder, and wherein each of the series of increasing bit rates produce progressively better reconstructed video quality at an output of the decoder, the progressive coded video bit stream being transmitted over a first part of the heterogeneous network at a first one of the bit rates, wherein the one or more programs when executed implement the step of:

selectively transmitting one or more of the portions of the progressive coded video bit stream from the first part of the heterogeneous network to a second part of the heterogeneous network, the one or more portions being associated with a second one of the bit rates lower than the first bit rate, the one or more portions and the associated second bit rate being selected based at least in part on one or more of: (i) an error detected in the transmission over the first part of the heterogeneous network; and (ii) a characteristic of the second part of the heterogeneous network;

wherein the portions are arranged within the progressive coded video bit stream in a predetermined sequence of increasing bit rates from an initial portion associated with a lowest one of the bit rates to a final portion associated with a highest one of the bit rates.

20. A video transmission system comprising:

a progressive video coder operative to code a video signal so as to generate a progressive coded video bit stream comprising a plurality of frames of the video signal, wherein the progressive coded video bit stream is configured to be decodable at any one of a series of increasing bit rates up to a maximum bit rate, depending on which of a number of corresponding portions of the progressive coded video bit stream are received by a decoder, the portions being arranged within the progressive coded video bit stream in a predetermined sequence of increasing bit rates from an initial portion associated with a lowest one of the bit rates to a final portion associated with a highest one of the bit rates, and wherein each of the series of increasing bit rates produce progressively better reconstructed video quality at an output of the decoder;

a heterogeneous network comprising at least a first part and a second part, the progressive coded video bit stream being transmitted over the first part of the heterogeneous network at a first one of the bit rates; and a network element coupled between the first part of the heterogeneous network and the second part of the heterogeneous network, the network element being operative to selectively transmit one or more of the portions of the progressive coded video bit stream from the first part of the heterogeneous network to the second part of the heterogeneous network, the one or more portions being associated with a second one of the bit rates lower than the first bit rate, the one or more portions and the associated second bit rate being selected based at least in part on one or more of: (i) an error detected in the transmission over the first part of the heterogeneous network; and (ii) a characteristic of the second part of the heterogeneous network.

* * * * *